(12) United States Patent
Rim

(10) Patent No.: US 11,662,514 B2
(45) Date of Patent: May 30, 2023

(54) ELECTRONIC DEVICE WITH GLASS PLATE

(71) Applicant: Samsung Electronics Co., Ltd., Gyeonggi-do (KR)

(72) Inventor: Changmook Rim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 17/517,784

(22) Filed: Nov. 3, 2021

(65) Prior Publication Data
US 2022/0057563 A1 Feb. 24, 2022

Related U.S. Application Data

(63) Continuation of application No. PCT/KR2020/008758, filed on Jul. 3, 2020.

(30) Foreign Application Priority Data

Jul. 23, 2019 (KR) .................. 10-2019-0088704

(51) Int. Cl.
*F21V 8/00* (2006.01)

(52) U.S. Cl.
CPC ......... *G02B 6/0043* (2013.01); *G02B 6/0088* (2013.01)

(58) Field of Classification Search
CPC .................. G02B 6/0043; G02B 6/0088
See application file for complete search history.

(56) References Cited

U.S. PATENT DOCUMENTS

| | | |
|---|---|---|
| 2012/0050975 A1 | 3/2012 | Garelli et al. |
| 2012/0055826 A1 | 3/2012 | Nishimura |
| 2013/0285953 A1 | 10/2013 | Cho et al. |
| 2014/0027709 A1 | 1/2014 | Higginson et al. |
| 2017/0220838 A1 | 8/2017 | He et al. |
| 2017/0364172 A1 | 12/2017 | Kim et al. |
| 2020/0046235 A1 | 2/2020 | Jung et al. |

FOREIGN PATENT DOCUMENTS

| | | |
|---|---|---|
| JP | 2008-030148 A | 2/2008 |
| KR | 10-2010-0044356 A | 4/2010 |
| KR | 10-2011-0015959 A | 2/2011 |
| KR | 10-2013-0081905 A | 7/2013 |
| KR | 10-2013-0120842 A | 11/2013 |
| KR | 10-2017-0005755 A | 1/2017 |
| KR | 10-2017-0143398 A | 12/2017 |
| KR | 10-2018-0093628 A | 8/2018 |

*Primary Examiner* — Mary Ellen Bowman
(74) *Attorney, Agent, or Firm* — Cha & Reiter, LLC

(57) ABSTRACT

An electronic device is disclosed, including: a glass plate including a first region and a second region extending from the first region to form a curved surface, wherein at least one predetermined first pattern is formed within at least a portion of the first region, a light emitter disposed adjacent to the second region of the glass plate and configured to emit light from the second region along the first region, a molded pattern layer disposed on the glass plate, the molded pattern layer including second patterns oriented as to face the glass plate, and a support film layer disposed on the molded pattern layer and configured to guide a path of the emitted light from the light emitter to an interior of the molded pattern layer.

14 Claims, 13 Drawing Sheets

ELECTRONIC DEVICE WITH GLASS PLATE

CROSS-REFERENCE TO RELATED APPLICATION(S)

This application is continuation of International Application No. PCT/KR2020/008758, filed on Jul. 3, 2020, which claims priority to Korean Patent Application No. 10-2019-0088704 filed on Jul. 23, 2019 in the Korean Intellectual Property Office, the disclosures of which are herein incorporated by reference.

BACKGROUND

1. Field

Certain embodiments of the disclosure relate to a glass plate, on which a predetermined pattern is formed, and an electronic device including the same.

2. Description of the Related Art

Due to the development of information communication technology, semiconductor technology, and the like, distribution and usage of various electronic devices are rapidly increasing. In particular, electronic devices of recent times have been developed to facilitate powerful communication functions in combination with high portability.

An electronic device may perform a variety of functions according to a programs installed therein, including electronic scheduling, multimedia playback, mobile communications, image/sound capture and recording, navigational functions, etc. The electronic device can be implemented as a tablet device, a desktop or laptop personal computer, a home appliance, a dedicated navigational system, a mobile terminal, etc. The aforementioned electronic devices may output, for example, stored information using sound or an imagery. As the degree of integration of electronic devices increases, and super-high-speed and large-capacity wireless communication become grow in popularity, multiple functions have become integrated into a single electronic device, such as a mobile communication terminal. For example, various functions, such as an entertainment function (e.g., gaming), a multimedia function (e.g., a music/video playback), communication and security/authentication (e.g., for mobile banking or the like), scheduling, and e-wallet functions, in addition to traditional communication functions, have come to be integrated within a single electronic device. Further, these electronic devices have grown in miniaturization facilitating a high degree of portability.

With this diversification, housings and/or display devices of these electronic devices have come to utilize various shapes and functions. For example, a front cover that covers a display panel of a display device, or a rear cover that covers the rear surface of the electronic device may be implemented as to include various colors and images, thereby increasing the aesthetic appeal of the device.

SUMMARY

In general, a plate covering the front surface and/or the rear surface of the electronic device may be manufactured by laminating a film having a pattern and/or a color on glass. In the above-mentioned manufacturing method, a method in which the pattern is exposed to the exterior of the device is determined in advance, and thus visibility may be degraded. In addition, the above-mentioned manufacturing method can produce only a single color, and thus the depth of the color represented in the plate may be insufficient to achieve the desired aesthetic quality.

According to certain embodiments of the disclosure, it is possible to implement a color-changeable structure in a plate covering the front surface and/or the rear surface of an electronic device, so that deeper color reproducibility can be provided.

According to certain embodiments of the disclosure, it is possible to provide various design effects by implementing a pattern in the glass plate itself, which covers the front surface and/or the rear surface of an electronic device.

An electronic device according to certain embodiments of the disclosure may include: a glass plate including a first region and a second region extending from the first region to form a curved surface, wherein at least one predetermined first pattern is formed within at least a portion of the first region, a light emitter disposed adjacent to the second region of the glass plate and configured to emit light from the second region along the first region, a molded pattern layer disposed on the glass plate, the molded pattern layer including second patterns oriented as to face the glass plate, and a support film layer disposed on the molded pattern layer and configured to guide a path of the emitted light from the light emitter to an interior of the molded pattern layer.

An electronic device according to certain embodiments of the disclosure may include: a housing, a printed circuit board disposed within the housing, a glass plate coupled to the housing and including at least one predetermined first pattern formed in a partial region thereof, a light emitter is electrically connected to the printed circuit board, and configured to emit light toward the glass plate, a printed film layer disposed on the glass plate, wherein the printed film layer includes a molded pattern layer including second patterns which are oriented to face the glass plate, and a support film layer disposed on the molded pattern layer and configured to guide a path of the emitted light from the light emitter to an interior of the molded pattern layer.

An electronic device according to certain embodiments of the disclosure may include: a glass plate including a first region and a second region extending from the first region to form a curved surface, wherein at least one predetermined first pattern is provided in at least a portion of the first region; a light source unit disposed adjacent to the second region of the glass plate and configured to provide light from the second region along the first region; a molded pattern layer disposed on the glass plate and including predetermined second patterns which are arranged to face the glass plate; and a support film layer disposed on the molded pattern layer, wherein the support film layer is configured to provide a path through which the light provided from the light source unit moves.

According to certain embodiments of the disclosure, it is possible to provide deep and alluring color reproducibility by configuring the plate that covers the front surface and/or the rear surface of the electronic device to selectively implement a desired color.

According to certain embodiments of the disclosure, it is possible to provide various design effects and beauty aesthetics by implementing a pattern in the glass pattern covering the front surface and/or the rear surface of the electronic device.

According to certain embodiments of the disclosure, it is possible to implement products having improved and differentiated design compared to previous products, by forming different patterns in which plates covering the front surface and/or the rear surfaces are disposed on one another, so that a desired pattern can be selectively emphasized.

DETAILED DESCRIPTION

Figure 1:
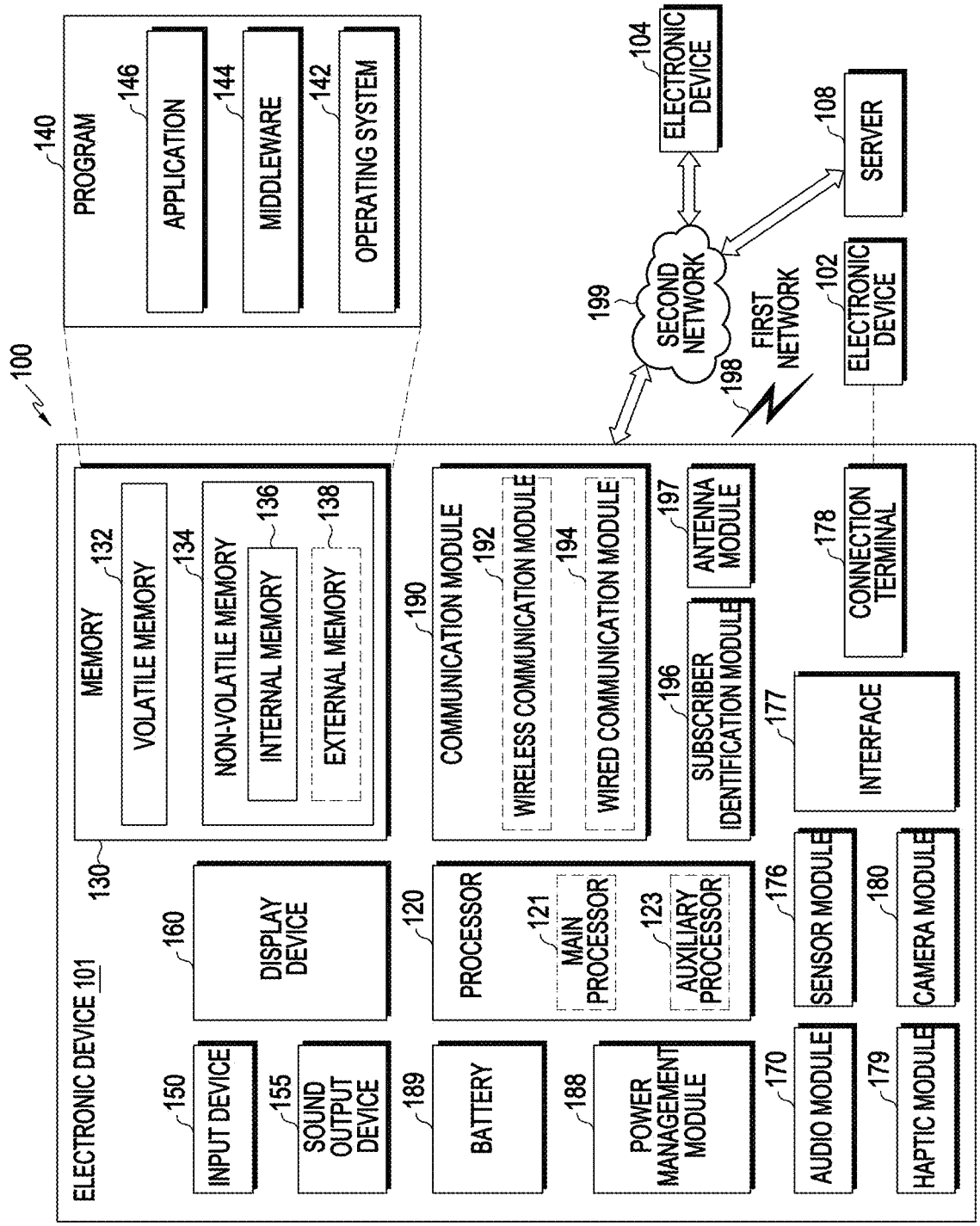
FIG. 1 is a block diagram of an example electronic device according to certain embodiments in a network environment.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
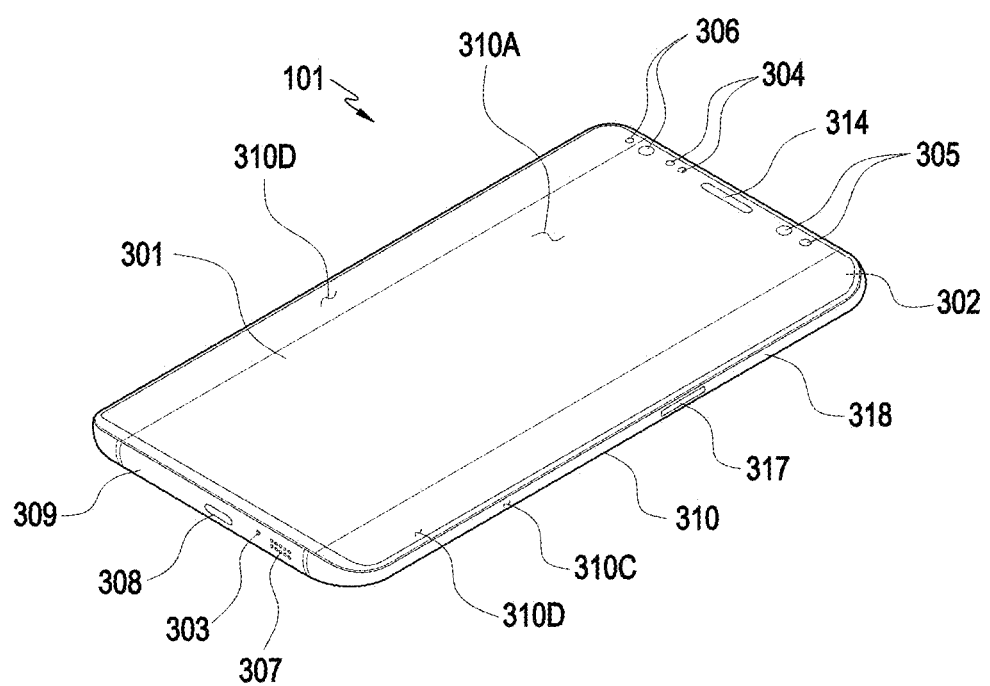
FIG. 2 is a front side perspective view illustrating an example electronic device according to certain embodiments of the disclosure.
Figure 3:
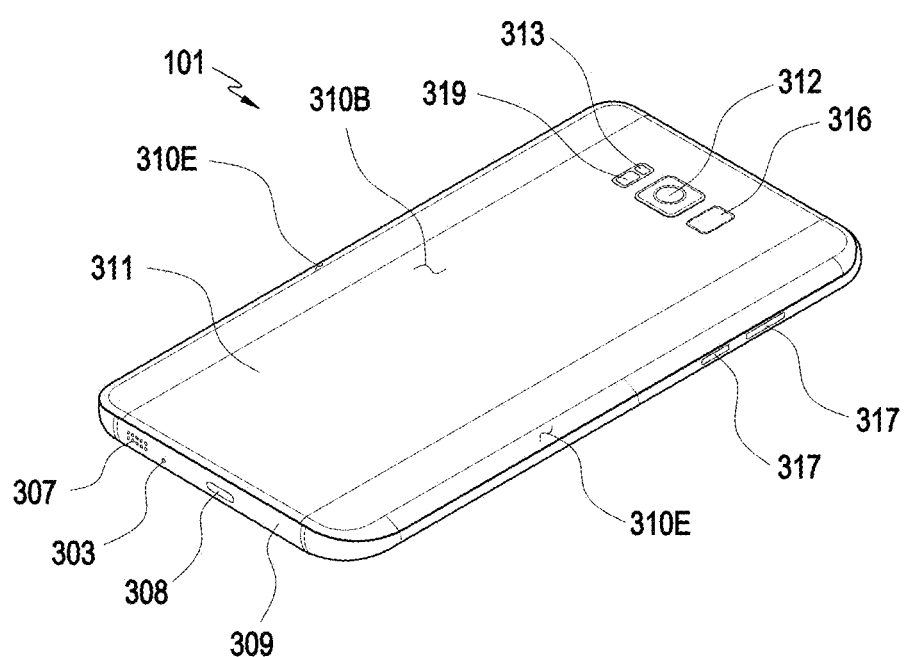
FIG. 3 is a rear side perspective view illustrating the example electronic device according to certain embodiments of the disclosure.

FIG. 2 is a front side perspective view illustrating an electronic device 101 according to certain embodiments of the disclosure. FIG. 3 is a rear side perspective view illustrating the electronic device 101 according to certain embodiments of the disclosure.

Referring to FIGS. 2 and 3, the electronic device 101 according to an embodiment may include a housing 310 including a first surface (or a front surface) 310A, a second surface (or a rear surface) 310B, and a side surface 310C surrounding the space between the first surface 310A and the second surface 310B. In another embodiment (not illustrated), the term "housing" may refer to a structure forming some of the first surface 310A, the second surface 310B, and the side surface 310C of FIG. 2. According to an embodiment, at least a portion of the first surface 310A may be formed of a substantially transparent front plate 302 (e.g., a glass plate or a polymer plate). The second surface 310B may be defined by a substantially opaque rear plate 311. The rear plate 311 may be made of, for example, coated or colored glass, ceramic, a polymer, a metal (e.g., aluminum, stainless steel (STS), or magnesium), or a combination of two or more of these materials. The side surface 310C may be defined by a side bezel structure (or a "side member") 318 coupled to the front plate 302 and the rear plate 311 and including a metal and/or a polymer. In some embodiments, the rear plate 311 and the side bezel structure 318 may be integrally configured, and may include the same material (e.g., a metal material such as aluminum).

In the illustrated embodiment, the front plate 302 may include, at the long opposite side edges (i.e., the long edges) thereof, two first regions 310D, which are bent from the first surface 310A toward the rear plate 311 and extend seamlessly. In the illustrated embodiment (see FIG. 3), the rear plate 311 may include, at the long opposite side edges thereof, two second regions 310E, which are bent from the second surface 310B toward the front plate 302 and extend seamlessly. In some embodiments, the front plate 302 (or the rear plate 311) may include one of the first regions 310D (or the second regions 310E). In another embodiment, some of the first regions 310D or the second regions 310E may not be included. In the embodiments described above, when viewed from the side of the electronic device 101, the side bezel structure 318 may have a first thickness (or width) on the side surface portions that do not include the first regions 310D or the second regions 310E described above, and may have a second thickness, which is smaller than the first thickness, on the side surface portions that include the first regions 310D or the second regions 310E.

According to an embodiment, the electronic device 101 may include at least one of a display 301, audio modules 303, 307, and 314, sensor modules 304, 316, and 319, camera modules 305, 312, and 313, key input devices 317, light-emitting elements 306, and connector holes 308 and 309. In some embodiments, at least one of the components (e.g., the key input devices 317 or the light-emitting elements 306) may be omitted from the electronic device 101, or other components may be additionally included in the electronic device 101.

According to an embodiment, the display 301 may be visually exposed through a substantial portion of, for example, the front plate 302. In some embodiments, at least a portion of the display 301 may be exposed through the front plate 302 defining the first surface 310A and the first regions 310D of the side surface 310C. In some embodiments, the edges of the display 301 may be configured to be substantially the same as the shape of the periphery of the front plate 302 adjacent thereto. In another embodiment (not illustrated), the distance between the periphery of the display 301 and the periphery of the front plate 302 may be substantially constant in order to enlarge the exposed area of the display 301.

In another embodiment (not illustrated), recesses or openings may be formed in some portions of the screen display region of the display 301, and one or more of the audio module 314, the sensor modules 304, the camera modules 305, and the light-emitting elements 306, which are aligned with the recesses or the openings, may be included. In another embodiment (not illustrated), the rear surface of the screen display region of the display 301 may include at least one of the audio modules 314, the sensor modules 304, the camera modules 305, the fingerprint sensor 316, and the light-emitting elements 306. In another embodiment (not illustrated), the display 301 may be coupled to or disposed adjacent to a touch-sensitive circuit, a pressure sensor capable of measuring a touch intensity (pressure), and/or a digitizer configured to detect a magnetic-field-type stylus pen. In some embodiments, at least some of the sensor modules 304 and 319 and/or at least some of the key input devices 317 may be disposed in the first regions 310D and/or the second regions 310E.

According to an embodiment, the audio modules 303, 307, and 314 may include a microphone hole and speaker holes. The microphone hole may include a microphone disposed therein to acquire external sound, and in some embodiments, a plurality of microphones may be disposed therein to be able to detect the direction of sound. The speaker holes may include an external speaker hole and a phone call receiver hole. In some embodiments, the speaker holes and the microphone hole may be implemented as a single hole, or a speaker may be included therein without the speaker holes and 314 (e.g., a piezo speaker). The audio modules 303, 307, and 314 are not limited to the above-described structure, and may be variously changed in design depending on the structure of the electronic device 101, for example, by mounting only some of the audio modules or by adding new audio modules.

According to an embodiment, the sensor modules 304, 316, and 319 may generate an electrical signal or a data value corresponding to, for example, the internal operating condition or the external environmental condition of the electronic device 101. The sensor modules 304, 316, and 319 may include, for example, a first sensor module 304 (e.g., a proximity sensor) and/or a second sensor module (not illustrated) (e.g., a fingerprint sensor) disposed on the first surface 310A of the housing 310, and/or a third sensor module 319 (e.g., an HRM sensor) and/or a fourth sensor module 316 (e.g., a fingerprint sensor) disposed on the second surface 310B of the housing 310. The fingerprint sensor may be disposed not only on the first surface 310A of the housing 310 (e.g., the display 301), but also on the second surface 310B. The electronic device 101 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 304. The sensor modules 304, 316, and 319 are not limited to the above-described structure, and may be variously changed in design depending on the structure of the electronic device 101, for example, by mounting some of the sensor modules or by adding new sensor modules.

According to an embodiment, the camera modules 305, 312, and 313 may include, for example, a first camera device 305 disposed on the first surface 310A of the electronic device 101, and a second camera device 312 and/or a flash 313 disposed on the second surface 310B. The camera modules 305 and 312 may include one or more lenses, an image sensor, and/or an image signal processor. The flash 313 may include, for example, a light-emitting diode or a xenon lamp. In some embodiments, two or more lenses (e.g., an infrared camera, a wide-angle lens, and a telephoto lens), and image sensors may be disposed on one surface of the electronic device 101. The camera modules 305, 312, and 313 are not limited to the above-described structure, and may be variously changed in design depending on the structure of the electronic device 101, for example, by mounting some of the camera modules or by adding new camera modules.

According to an embodiment, the key input devices 317 may be disposed on the side surface 310C of the housing 310. In another embodiment, the electronic device 101 may not include all or part of the above-mentioned key input devices 317, and a key input device 317, which is not included in the electronic device 101, may be implemented in another form, such as a soft key (e.g., software-based), on the display 301. In some embodiments, the key input devices may include a sensor module 316 disposed on the second surface 310B of the housing 310.

According to an embodiment, the light-emitting element 306 may be disposed on, for example, the first surface 310A of the housing 310. The light-emitting elements 306 may provide, for example, information about the state of the electronic device 101 in an optical form. In another embodiment, the light-emitting elements 306 may provide a light source that is interlocked with, for example, the operation of the camera module 305. The light-emitting elements 306 may include, for example, one or more of an LED, an IR LED, and a xenon lamp.

According to an embodiment, the connector holes 308 and 309 may include, for example, a first connector hole 308 capable of accommodating a connector (e.g., a USB connector) for transmitting/receiving power and/or data to/from an external electronic device, and/or a second connector hole 309 capable of accommodating a connector (e.g., an earphone jack) for transmitting/receiving an audio signal to/from an external electronic device. The connector holes 308 and 309 are not limited to the above-described structure, and may be variously changed in design depending on the structure of the electronic device 101, for example, by providing some of the connector holes or by adding new connector holes.

Figure 4:
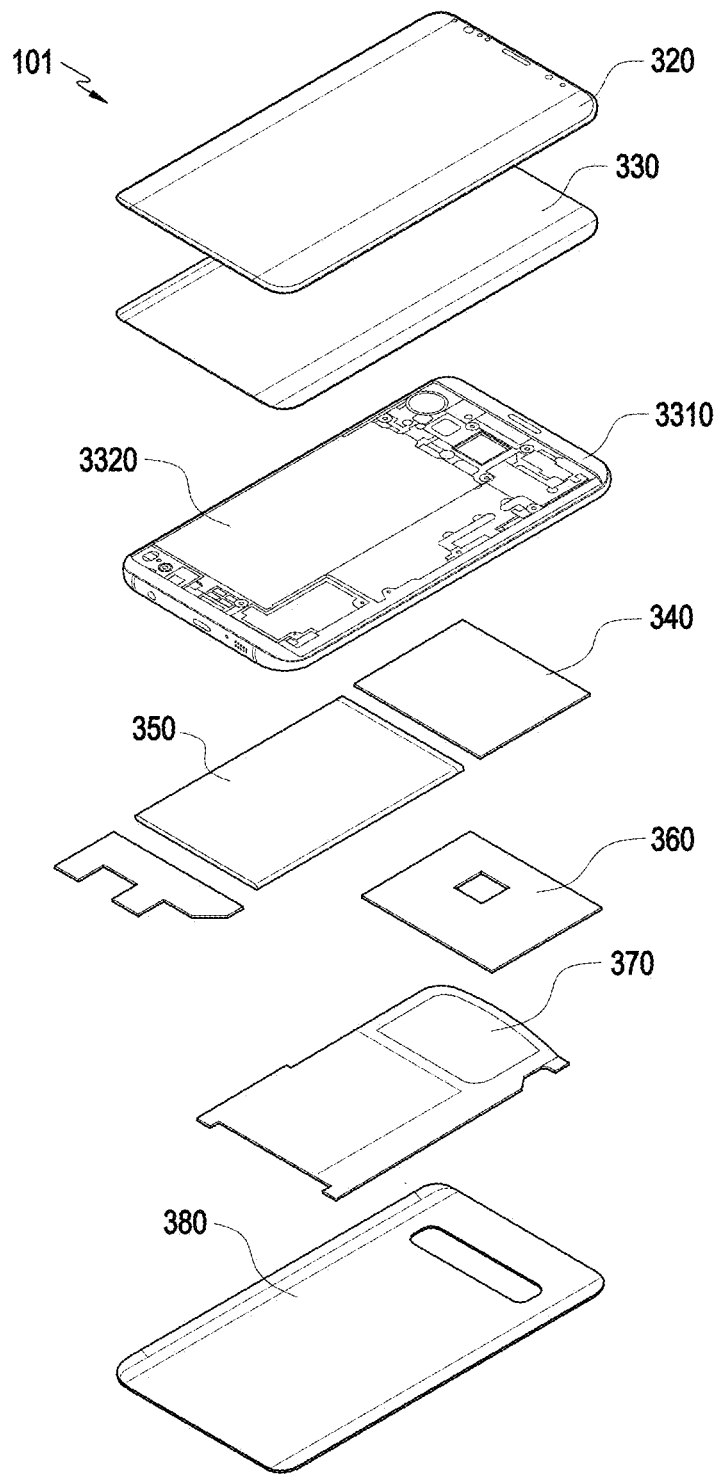
FIG. 4 is an exploded perspective view illustrating an example electronic device according to certain embodiments of the disclosure.

FIG. 4 is an exploded perspective view illustrating an electronic device 101 according to certain embodiments.

Referring to FIG. 4, the electronic device 101 according to certain embodiments (e.g., the electronic device 101 in FIGS. 1 to 3) may include a side bezel structure 3310, a first support member 3320 (e.g., a bracket), a front plate 320, a display 330, a printed circuit board 340, a battery 350, a second support member 360 (e.g., a rear case), an antenna 370, and a rear plate 380. In some embodiments, at least one of the components (e.g., the first support member 3320 or the second support member 360) may be omitted from the electronic device 101, or other components may be additionally included in the electronic device 101. At least one of the components of the electronic device 101 may be the same as or similar to at least one of the components of the electronic device 101 of FIG. 2 or FIG. 3, and a redundant description thereof is omitted below.

According to certain embodiments, the first support member 3320 may be disposed inside the electronic device 101, and the first support member 3320 may be connected to the side bezel structure 3310, or may be integrated with the side bezel structure 3310. The first support member 3320 may be made of, for example, a metal material and/or a non-metal material (e.g., a polymer). The display 330 may be coupled to one surface of the first support member 3320, and the printed circuit board 340 may be coupled to the other surface of the first support member 3320. On the printed circuit board 340, a processor, a memory, and/or an interface may be mounted. The processor may include one or more of, for example, a central processing unit, an application processor, a graphics processor, an image signal processor, a sensor hub processor, or a communication processor.

According to certain embodiments, the memory may include, for example, a volatile memory or a nonvolatile memory.

According to certain embodiments, the interface may include, for example, a high-definition multimedia interface (HDMI), a universal serial bus (USB) interface, an SD card interface, and/or an audio interface. The interface may electrically or physically connect, for example, the electronic device 101 to an external electronic device, and may include a USB connector, an SD card/an MMC connector, or an audio connector.

According to certain embodiments, the battery 350 is a device for supplying power to at least one component of the electronic device 101 and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed inside the electronic device 101, or may be detachably disposed on the electronic device 101.

According to certain embodiments, the antenna 370 may be disposed between the rear plate 380 and the battery 350. The antenna 370 may include, for example, a near-field communication (NFC) antenna, a wireless charging antenna, and/or a magnetic secure transmission (MST) antenna. The antenna 370 may perform short-range communication with, for example, an external electronic device, or may transmit/receive power utilized for charging to/from the external device in a wireless manner. In another embodiment, an antenna structure may be implemented by a portion of the side bezel structure 3310, a portion of the first support member 3320, or a combination thereof.

Figure 5:
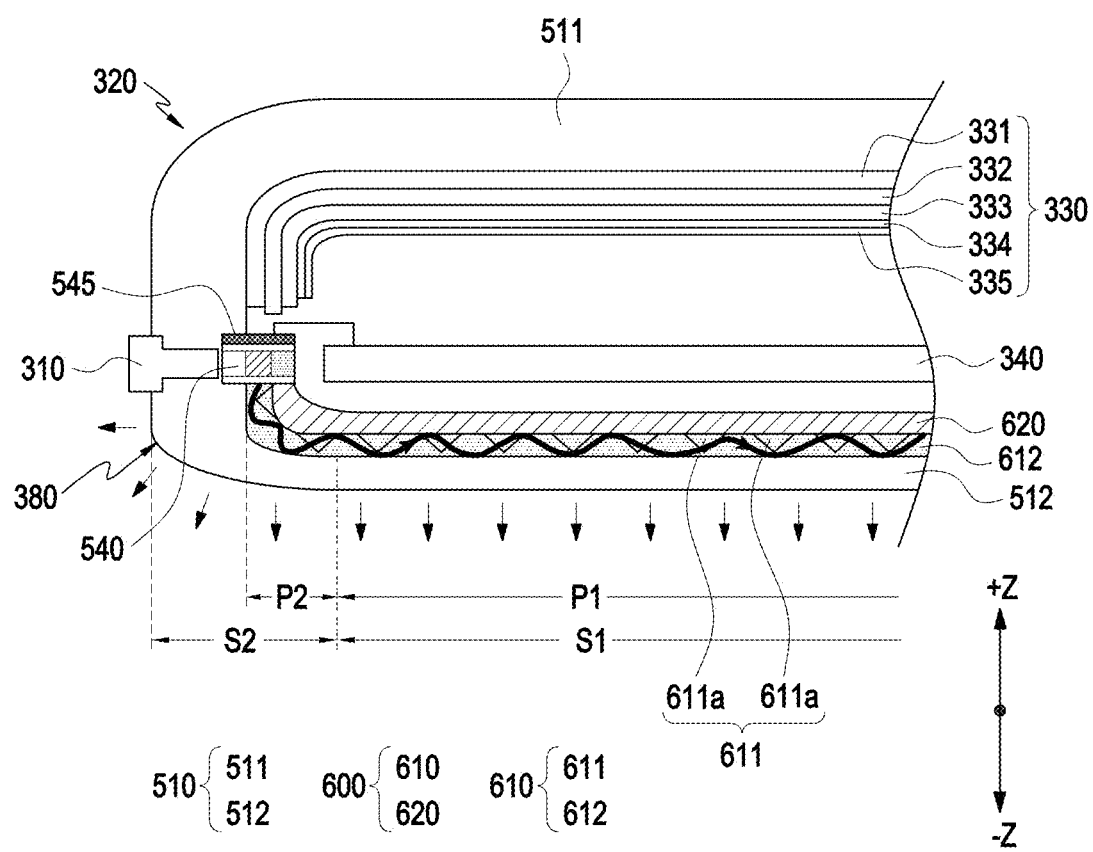
FIG. 5 is a cross-sectional view illustrating an example laminated structure of a rear plate of an electronic device and a path of light provided from a light source unit, according to certain embodiments of the disclosure.

FIG. 5 is a cross-sectional view illustrating a laminated structure of a rear plate of an electronic device and a path of light provided from a light source unit, according to certain embodiments of the disclosure.

Figure 6:
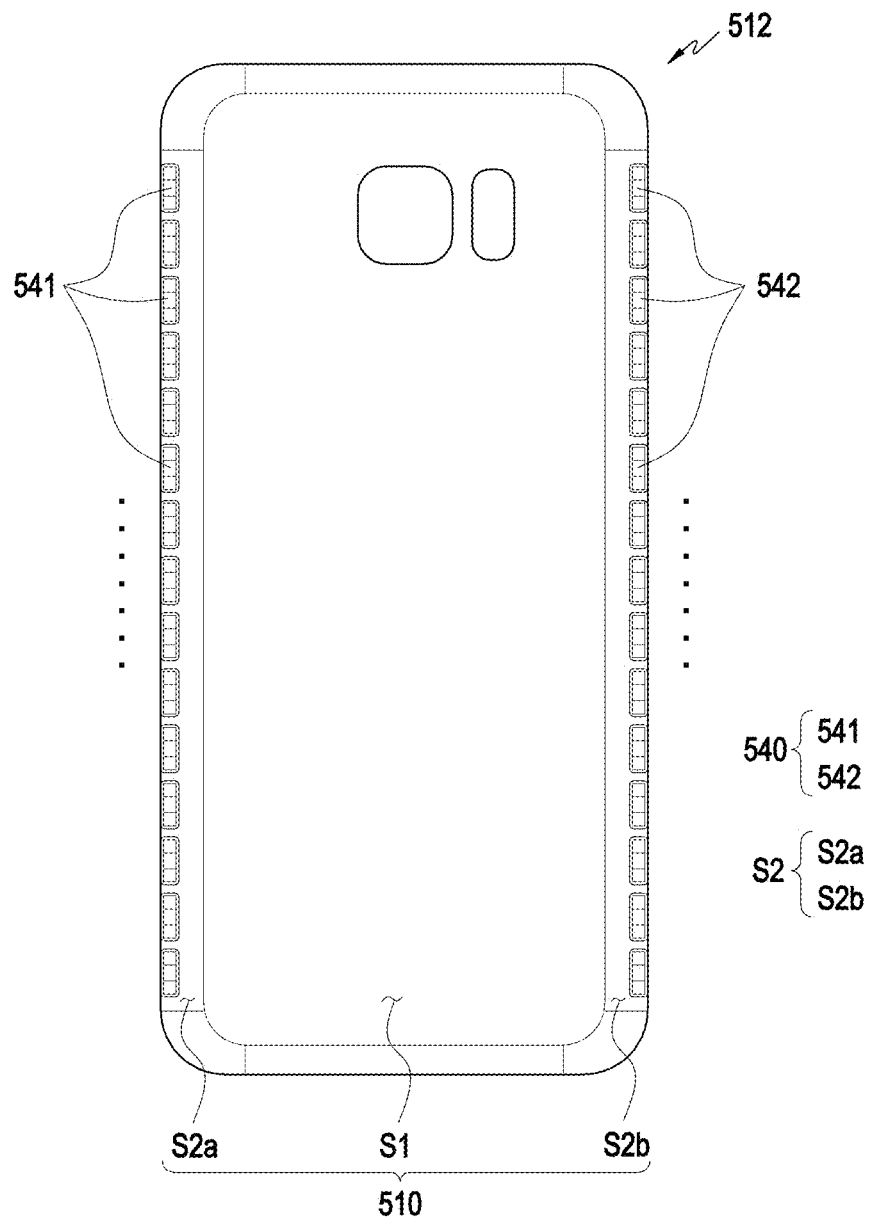
FIG. 6 is a front view illustrating an example arrangement of a plurality of light sources disposed on a rear plate according to certain embodiments of the disclosure.
Figure 7A:
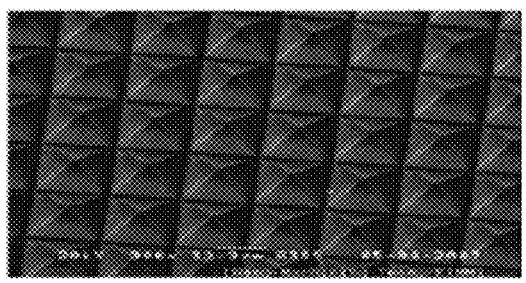
FIG. 7 is enlarged view illustrating an example pattern structures of a partial region of a first printed film layer including a rear plate according to certain embodiments of the disclosure.
Figure 7B:
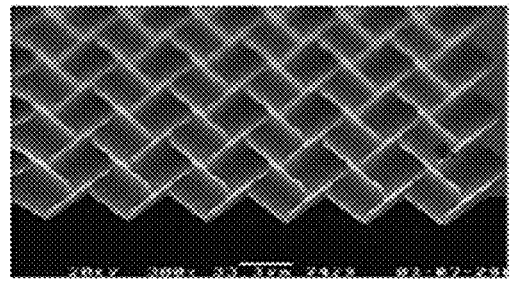
Figure 7C:
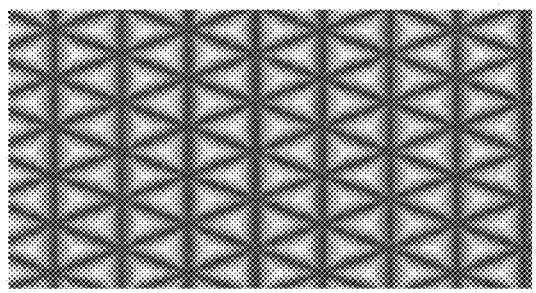
Figure 7D:
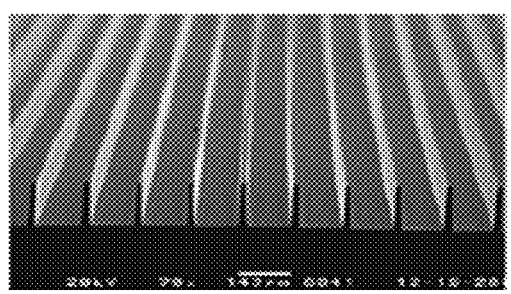

FIG. 6 is a front view illustrating an arrangement of a plurality of light sources disposed on a rear plate according to certain embodiments of the disclosure.

FIG. 7 is enlarged view illustrating pattern structures of a partial region of a first printed film layer including a rear plate according to certain embodiments of the disclosure.

According to certain embodiments, an electronic device (e.g., the electronic device 101 in FIGS. 1 to 4) may include a housing 310, a display 330, a printed circuit board 340, a glass plate 510, and a printed film layer 600, and a light source unit 540. According to an embodiment, the configurations of the housing 310, the display 330, and the printed circuit board 340 of FIG. 5 may be the same in whole or in part as those of the first support member 3320, the display 330, and the printed circuit of FIG. 4.

In FIG. 5, the "Z" directions may indicate the thickness direction (e.g., the widthwise direction) of the electronic device 101. In addition, in an embodiment of the disclosure, "+Z" may indicate a forward direction in which the front plate 320 inside the electronic device is oriented, and "−Z" may indicate a rearward direction in which the rear plate 380 of the electronic device is oriented.

According to certain embodiments, the display 330 may be disposed (e.g., oriented) to face one surface of the front plate 320. The display 330 may include a plurality of layers 331 to 335 laminated in an inward direction of the electronic device. For example, a UV layer 331, a display panel 332, a light-shielding layer 333, a support layer 334, and a metal layer 335 are laminated in this order respective to one surface of the front glass plate 511. However, in addition to the lamination order, the lamination sequence may be altered in design to increase efficiency, depending on buffering, shielding, and/or heat dissipation.

According to an embodiment, the UV layer 331 of the display 330 may be bonded to one surface of a first glass plate 511 (e.g., the front glass plate), which is oriented in the first direction (+Z), and may be manufactured in a curved shape to face the second region S2 of the first glass plate 511. According to an embodiment, a light-shielding layer 333 may be provided to shield the rear surface of the display panel 332. The light-shielding layer 333 may include, for example, a cushioning member, an embossing member, or a copper (Cu) sheet, and may further include a black color. As another example, the support layer 334 may support the display 330, and the metal layer 335 may provide a heat dissipation function for blocking heat from a board or to prevent the heat from transmission to the display panel 332. For example, the metal layer 335 may include a graphite material.

According to certain embodiments of the disclosure, the glass plate 510 of the electronic device 101 may include a first glass plate 511, which covers at least a part of the front and the side surface of the electronic device 101, and a second glass plate 512, which covers at least a part of the rear surface and the side surface of the electronic device 101. At least a portion of the glass plate 510 may be formed of a transparent glass material. At least a portion of the glass plate 510 may include a curved surface (e.g., 2.5D or 3D). For example, the glass plate 510 may include a flat first region S1 (e.g., a flat portion) and a second region S2 (e.g., a curved portion) forming a curved surface extending from the first region S1. The first region S1 may be a central region of the glass plate 510, and the second region S2 may be a portion of an end region of the glass plate 510. The second region S2 may include a curved structure which is seamlessly bent in the forward direction (+Z), and may be disposed in a longitudinal edge region of the glass plate 510.

According to an embodiment, referring to FIG. 6, second regions S2 of the second glass plate 512 may be provided in edge regions of the second glass plate 512 with the first region S1 as a center. For example, the second regions S2 may include a $(2-1)^{th}$ region S2$a$ and a $(2-2)^{th}$ region S2$b$, and the $(2-1)^{th}$ region S2$a$ and the $(2-2)^{th}$ region S2$b$ may be provided at opposite ends of the glass plate 510 in the longitudinal direction (X), but may be omitted at opposite ends of the glass plate 510 in the width direction (Y).

According to certain embodiments, a light source unit 540 (e.g., a light emitter) may be disposed adjacent to the second regions S2 of the glass plate 510, and the light source unit 540 may emit light to illuminate the second region S2 and the region S1. For example, the emitted light may travel from the second region S2 along the first region S1.

According to an embodiment, at least a part of the light source unit 540 may be disposed inside the housing 310 defining a side surface of the electronic device 101. For example, when viewed from above the electronic device 101 or the glass plate 510, the light source unit 540 may be disposed in a longitudinal edge of the electronic device 101 or the glass plate 510.

According to an embodiment, the light source unit 540 may use a micro-LED. For example, the micro-LED may use an LED chip itself as a pixel, and may have excellent power efficiency compared to an OLED and an LCD, thereby reducing battery consumption. Since each LED can express red (R), green (G), and blue (B), the micro-LED may be more flexible than general LEDs and can be microminiaturized (to 100 μm or less). Since the microminiaturized light source unit 540 is mounted inside the housing 310 in the side region of the electronic device 101, manufacturing design is possible without additionally securing a mounting space.

According to an embodiment, by disposing a shielding member 545 in a region which does not require illumination by light, it is possible to provide a path for the emitted light specifically in a predetermined direction the light source unit 540. For example, by disposing the shielding member 545 on one surface of the light source unit 540 that is oriented in the first direction (+Z), it is possible to prevent light leakage that may occur in an edge region of the first glass plate 511. In addition, the light emitted from the light source unit 540 may move travel specifically toward the second glass plate 512.

According to an embodiment, a plurality of light source units 540 may be arranged along the side edges of the housing 310. Referring back to FIG. 6, the light source units 540 may include a first light source unit 541 in which a plurality of micro-LEDs are arranged along a $(2-1)^{th}$ region S2$a$ of the second glass plate 512, and a second light source unit 542 in which a plurality of micro-LEDs are arranged along the $(2-2)^{th}$ region S2$b$ of the second glass plate 512. For example, the plurality of micro-LEDs of the first light source unit 541 may be arranged along a longitudinal edge (long edge) region of the glass plate 510, and the light provided from the first light source unit 541 may emit light to illuminate the second glass plate 512 while moving from the curved portion P2 to the flat portion P1 inside the printed film layer 600. As another example, the plurality of micro-LEDs of the second light source unit 542 may be arranged along a longitudinal edge (long edge) region of the second glass plate 512 in a direction opposite to the direction in which the first light source unit 541 is disposed. The light provided from the second light source unit 542 may emit light to illuminate the second glass plate 512 while moving from the curved portion P2 to the flat portion P1 inside the printed film layer 600. The light source unit 540 may selectively provide various colors desired by a user to the second glass plate 512, thereby providing a stereoscopic effect and dynamic aesthetic to the rear plate 380.

According to an embodiment, the light source units 540 may be electrically connected to the printed circuit board 340. For example, a power integration line electrically connected to the plurality of micro-LEDs of the light source units 540 may be electrically connected to the printed circuit board 340, or each of the plurality of micro-LEDs of the light source units 540 may be individually connected to the printed circuit board 340.

The structure in which the light source unit 540 provides light to the second glass plate 512 according to the disclosure has been described, but the disclosure is not limited thereto. Aesthetics may be expressed through light providing various colors to a bezel region of the electronic device 101 by providing light toward the first glass plate 511.

According to certain embodiments, a printed film layer 600 may be disposed on one surface of the glass plate 510. For example, the printed film layer 600 may be provided in a shape corresponding to the first region S1 and the second region S2 of the glass plate 510, and may be laminated on one surface of the glass plate 510 that is oriented in the first direction (+Z). For example, the printed film layer 600 may include a flat portion P1 corresponding to the first region S1 and a curved portion P2 extending from the flat portion P1 and forming a curved surface, such that the curved portion P2 corresponds to the second region S2.

According to certain embodiments, the printed film layer 600 may be implemented using multiple layers. For example, the printed film layer 600 may include a molded pattern layer 610 and a support film layer 620.

According to an embodiment, the molded pattern layer 610 may include a molded pattern structure 611 and a light guide layer 612. The molded pattern structure 611 of the molded pattern layer 610 may be disposed on the second glass plate 512, and may have a structure in which predetermined second patterns 611a are arranged (or oriented) to face the second glass plate 512 (e.g., to be oriented in the second direction (−Z)).

According to an embodiment, a plurality of second patterns 611a of the molded pattern structure 611 may be arranged at a predetermined interval, and the light provided from the light source unit 540 may be transmitted to the glass plate 510 to provide a sense of color and a sense of pattern. Different examples of the arrangement and shape for the second patterns 611a are illustrated in FIGS. 7A, 7B, 7C and 7D. For example, the second patterns 611a may be formed in various molded patterns of, for example, a pyramid structure, a triangular structure, a dot structure, and the like, and the second patterns 611a may be arranged regularly. The arrangement of the predetermined second patterns 611a may uniformly transmit light, which may be totally reflected along the light guide layer 612, to the entire region of the second glass plate 512 or may locally transmit the light to one region of the second glass plate 512, thereby providing a sense of color and a sense of pattern.

According to an embodiment, the light guide layer 612 of the molded pattern layer 610 may provide a traversal path for light emitted from the light source unit 540. At least a portion of the light guide layer 612 may be disposed between the second patterns 611a, or disposed in contact with one surface of the same to cover the arrangement of the second patterns 611a. The light guide layer 612 may extend from the curved portion P2 on which the light source unit 540 is disposed to the flat portion P1, and the light emitted from the light source unit 540 may proceed to the flat portion P1 through the curved portion P2, while either totally reflected or irregularly reflected from some of the second patterns 611a disposed on the path of light, so as to be directed toward the second glass plate 512.

According to an embodiment, the support film layer 620 of the printed film layer 600 may be a polyethylene terephthalate (PET) film layer, which is disposed on the molded pattern layer 610, and may guide a path for light emitted from the light source unit 540, such that the emitted light moves along an interior of the molded pattern layer 610. For example, the support film layer 620 may be formed of a material having a refractive index different from that of the light guide layer 612 of the molded pattern layer 610, to guide the emitted light provided from the light source unit 540 so as to be totally reflected from the boundary between the support film layer 620 and the light guide layer 612.

Figure 8:
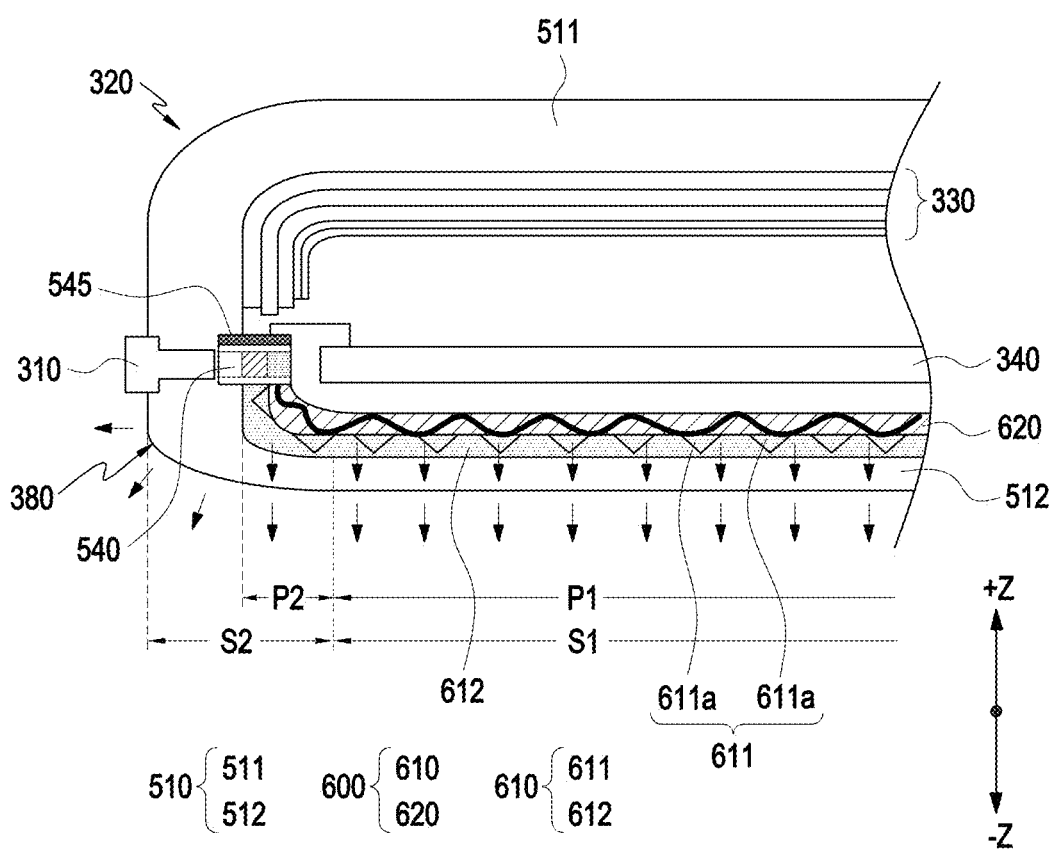
FIG. 8 is a cross-sectional view illustrating an example laminated structure of a rear plate of an electronic device and a path of light provided from a light source unit, according to another embodiment of the disclosure.

FIG. 8 is a cross-sectional view illustrating a laminated structure of a rear plate of an electronic device, and a path of light for light emissions from a light source unit, according to another embodiment of the disclosure.

According to certain embodiments, an electronic device (e.g., the electronic device 101 in FIGS. 1 to 4) may include a housing 310, a display 330, a printed circuit board 340, a glass plate 510, and a printed film layer 600, and a light source unit 540. According to an embodiment, the configurations of the housing 310, the display 330, the printed circuit board 340, the glass plate 510, the printed film layer 600, and the light source unit 540 of FIG. 8 may be the same in whole or in part as those of the configurations of the housing 310, the display 330, the printed circuit board 340, the glass plate 510, the printed film layer 600, and the light source unit 540 of FIGS. 5 to 7D.

In FIG. 8, "Z" may indicate the thickness direction (e.g., a widthwise direction) of the electronic device 101. In addition, in an embodiment of the disclosure, "+Z" may indicate the forward direction in which the front plate 320 inside the electronic device is oriented, and "−Z" may indicate the rearward direction in which the rear plate 380 is oriented.

Hereinafter, a light transmission path different from the one shown in FIG. 5 will be described.

According to certain embodiments, a printed film layer 600 may be disposed on one surface of the second glass plate 512. For example, the printed film layer 600 may be implemented using multiple layers. The printed film layer 600 may include a molded pattern layer 610 laminated on one surface of the glass plate 510, and a molded pattern structure. The printed film layer 600 may include a support film layer 620 laminated on one surface of the molded pattern layer 610 and including a PET material.

According to certain embodiments, the support film layer 620 may provide an optical waveguide function for forming a path of light. The support film layer 620 may include a flat portion P1 corresponding to the first region S1 of the second glass plate 512, and a curved portion P2 extending from the flat portion P1 to form a curved surface, such that the curved portion P2 corresponds to the second region S2 of the glass plate 512.

According to an embodiment, the support film layer 620 may form a path through which the light emitted from the light source unit 540 traverses the interiors of the first region S1 and the second region S2. For example, the light emitted from the light source unit 540 may proceed to the flat portion P1 through the curved portion P2, while either totally reflected (e.g., entirely) or irregularly (e.g., partly) reflected from some of the second patterns 611a disposed on the path of light, to be directed toward the second glass plate 512. When the support film layer 620 provides an optical waveguide function for forming a path of light, the molded pattern layer 610 may not form a light path.

In the electronic device of the disclosure, when the light is totally reflected along the support film layer 620, the light may be uniformly transmitted to an entire region of the second glass plate 512, or may be locally transmitted to a particular region of the second glass plate 512, so as to provide a sense of color and a sense of pattern.

Figure 9:
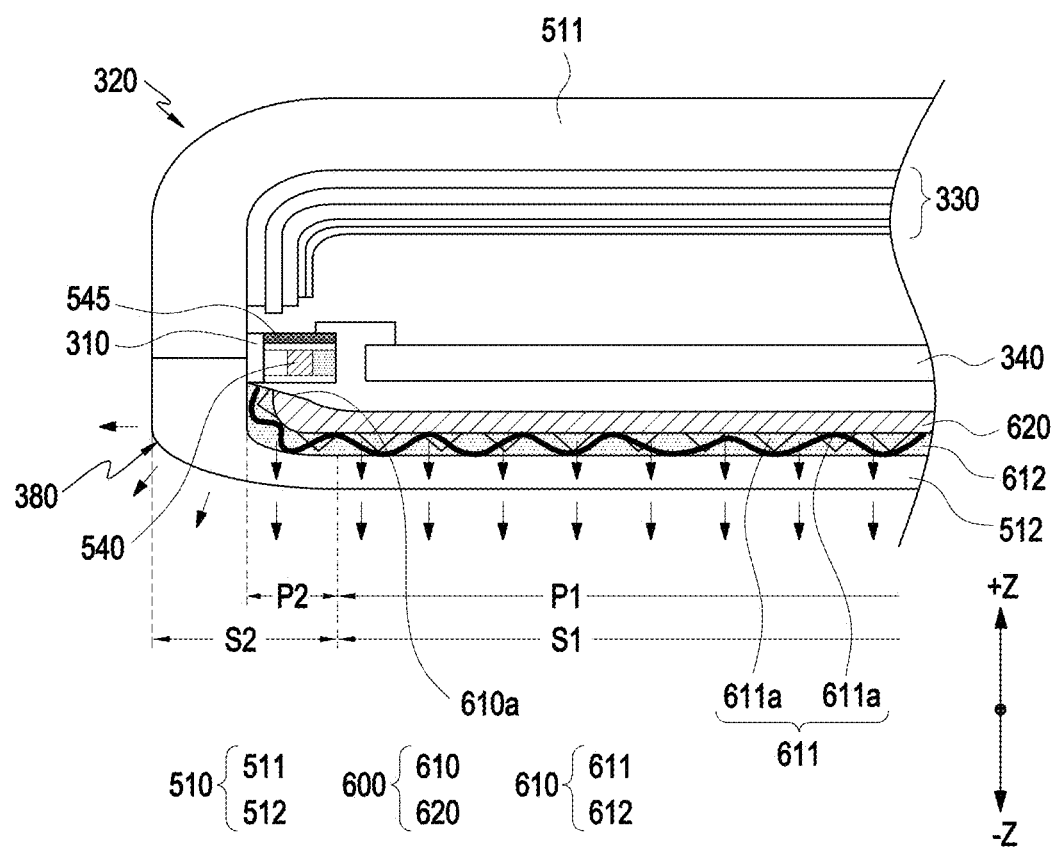
FIG. 9 is a cross-sectional view illustrating an example laminated structure of a rear plate of an electronic device and a path of light provided from a light source unit, according to still another embodiment of the disclosure.

FIG. 9 is a cross-sectional view illustrating a laminated structure of a rear plate of an electronic device and a path of light provided from a light source unit, according to another embodiment of the disclosure.

According to certain embodiments, an electronic device (e.g., the electronic device 101 in FIGS. 1 to 4) may include a housing 310, a display 330, a printed circuit board 340, a glass plate 510, and a printed film layer 600, and a light source unit 540. According to an embodiment, some of the configurations of the housing 310, the glass plate 510, the display 330, the printed circuit board 340, and the printed film layer 600 of FIG. 9 may be the same in part as those of the housing 310, the glass plate 510, the display 330, the printed circuit board 340, and the printed film layer 600.

In FIG. 9, "Z" may indicate the thickness direction (e.g., a widthwise direction) of the electronic device 101. In addition, in an embodiment of the disclosure, "+Z" may indicate the forward direction in which the front plate 320 inside the electronic device is oriented, and "−Z" may indicate the rearward direction in which the rear plate 380 is oriented.

Hereinafter, an arrangement of the light source unit 540 and the configuration of the printed film layer 600 different from those of FIG. 5 will be described.

According to certain embodiments, the light source unit 540 may be disposed adjacent to the second region S2 including the curved portion of the glass plate 510, and may emit light toward the first region S1 from the second region S2. For example, the outer surface of the electronic device 101 is entirely covered by the first glass plate 511 and the second glass plate 512, and the housing 310 may be located in the inner space defined by the first glass plate 511 and the second glass plate 512. The housing 310 may include a printed circuit board 340 and various electronic components mounted therein, and the light source unit 540 may be disposed on a longitudinal edge (long edge) region of the housing 310. Compared to the light source unit 540 of FIG. 5, the light source unit 540 of FIG. 9 may be mounted inside the electronic device to be closer to the center.

According to an embodiment, the light source unit 540 may use a micro-LED. By disposing a shielding member 545 in a region for which no illumination is desired, it is possible to guide the light emitted from the light source unit 540 along a path in a predetermined direction the light source unit 540. For example, by disposing the shielding member 545 on one surface of the light source unit 540 that is oriented in the first direction (+Z), it is possible to prevent light leakage that may occur in an edge region of the first glass plate 511. In addition, the light emitted from the light source unit 540 may move specifically toward the second glass plate 512.

According to an embodiment, in order to enable the light emitted from the light source unit 540 to be efficiently transmitted to the molded pattern layer 610, the light source unit 540 or the molded pattern layer 610 may be inclined in at least a partial region. For example, a light-emitting region of the light source unit 540 may be disposed to have a predetermined inclination toward an end of the molded pattern layer 610. Accordingly, it is possible to reduce a separation distance through which the light emitted from the light source unit 540 enters the molded pattern layer 610.

As another example, an end region of the molded pattern layer 610 may form an inclined surface 610a having a predetermined inclination toward the inside of the electronic device 101. The inclined surface 610a may reduce the length of the path through which the light emitted from the light source unit 540 reaches the molded pattern layer 610, and the light-reached surface can be expanded to reduce a loss of light when deviating from the inclined surface 610a.

Figure 10:
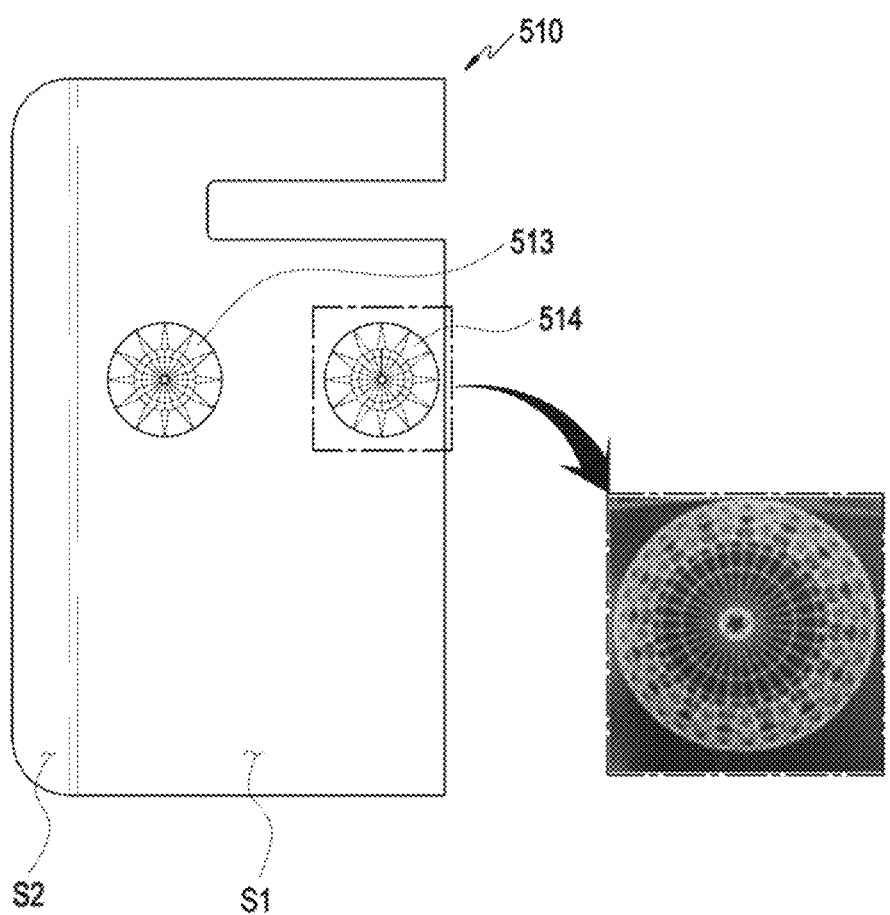
FIG. 10 is a view illustrating an example pattern provided in at least a partial region of a glass plate according to certain embodiments of the disclosure.
Figure 11:
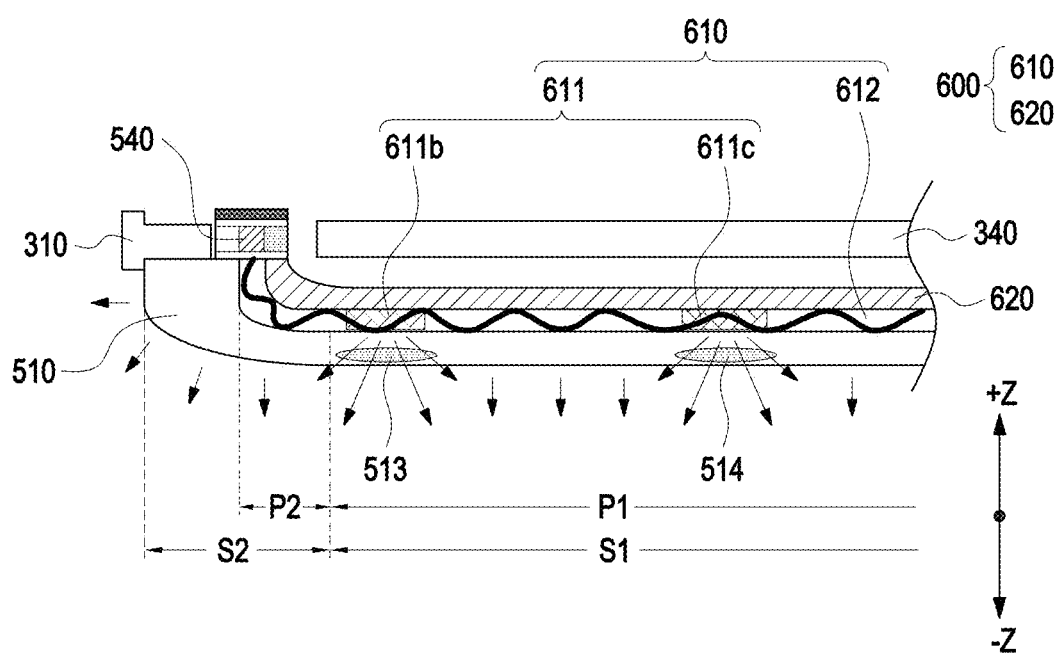
FIG. 11 is a cross-sectional view illustrating an example laminated structure of a rear plate of an electronic device and a path of light provided from a light source unit, according to another embodiment of the disclosure.

FIG. 10 is a view illustrating a pattern provided in at least a partial region of a glass plate according to certain embodiments of the disclosure. FIG. 11 is a cross-sectional view illustrating a laminated structure of a rear plate of an electronic device and a path of light provided from a light source unit, according to certain embodiments of the disclosure.

According to certain embodiments, an electronic device (e.g., the electronic device 101 in FIGS. 1 to 4) may include a housing 310, a display 330, a printed circuit board 340, a glass plate 510, and a printed film layer 600, and a light source unit 540. According to an embodiment, the configurations of the housing 310, the display 330, the printed circuit board 340, the glass plate 510, the printed film layer 600, and the light source unit 540 of FIGS. 10 and 11 may be the same in whole or in part as those of the configurations of the housing 310, the display 330, the printed circuit board 340, the glass plate 510, the printed film layer 600, and the light source unit 540 of FIGS. 5 to 7D.

In FIG. 11, "Z" may indicate the thickness direction (e.g., the widthwise direction) of the electronic device 101. In addition, in an embodiment of the disclosure, "+Z" may indicate a forward direction in which the front plate (e.g., the front plate 320 in FIG. 5) inside the electronic device is oriented, and "−Z" may indicate a rearward direction in which the rear plate (e.g., the rear plate 380 in FIG. 5) is oriented.

Hereinafter, a detailed configuration of the glass plate 510 and a light transmission path, which are different from those of FIG. 5, will be described.

According to certain embodiments, the glass plate 510 may include a flat first region S1 and a second region S2 forming a curved surface extending from the first region S1. The first region S1 may be a central region of the glass plate 510, and the second region S2 may be a portion of an end region of the glass plate 510. The second region S2 has a curved structure which are seamlessly bent in the forward direction (+Z), and may be disposed in a longitudinal edge region of the glass plate 510.

According to certain embodiments, predetermined first patterns 513 and 514 may be provided in the first region S1 of the glass plate 510. The predetermined first patterns 513 and 514 may be implemented through a micro-blasting method. For example, various images or character patterns may be directly etched on the glass plate 510 using a pattern mask (e.g., a metal mask) on which various images or character patterns are formed. The various images and letter patterns may be implemented as 2D and 3D images in at least a partial region of the glass plate 510 in a design image desired by an operator through micro-blasting.

According to an embodiment, a plurality of the first patterns 513 and 514 may be arranged at a predetermined interval, and may appear locally in one region of the glass plate 510. Accordingly, the light provided from the light source unit 540 made of micro-LEDs may be transmitted to the first patterns 513 and 514 of the glass plate 510 to provide a sense of color and a sense of pattern.

According to certain embodiments, the positions of the first patterns 513 and 514 provided on the glass plate 510 and the positions of the second patterns 611a provided on the molded pattern layer 610 may be disposed to face each other. For example, a $(1\text{-}1)^{th}$ pattern 513 and a $(1\text{-}2)^{th}$ pattern 514 may be disposed on the glass plate 510 to be spaced apart from each other. The molded pattern layer 610 may include a $(2\text{-}1)^{th}$ pattern 611b disposed to face at least a portion of the $(1\text{-}1)^{th}$ pattern 513 and a $(2\text{-}2)$th pattern 611c disposed to face at least a portion of the $(1\text{-}2)^{th}$ pattern 514. While passing through the light guide layer 612 of the molded pattern layer 610, the light emitted from the light source unit 540 may be irregularly reflected in the state in which the amount of light is increased in the portion in which the $(2\text{-}1)^{th}$ pattern 611b and the $(2\text{-}2)^{th}$ pattern 611c are located, and may be provided to the glass plate 510. When the light is provided to the $(1\text{-}1)^{th}$ pattern 513 and the $(1\text{-}2)^{th}$ pattern 514 at the positions corresponding to the $(2\text{-}1)^{th}$ pattern 611b and the $(2\text{-}2)^{th}$ pattern 611c, the portion in which the $(1\text{-}1)^{th}$ pattern 513 and the $(1\text{-}2)^{th}$ pattern 514 are located may provide a differentiated and dynamic light-emitting effect compared to the surrounding region due to the concentration of light. In addition, the light passing through the light guide layer 612 may be concentrated in the $(1\text{-}1)^{th}$ pattern 513 and the (1-2)$^{th}$ pattern 514 to reduce light loss occurring in an unnecessary region and to provide a beautiful aesthetic, according to the pattern.

Figure 12:
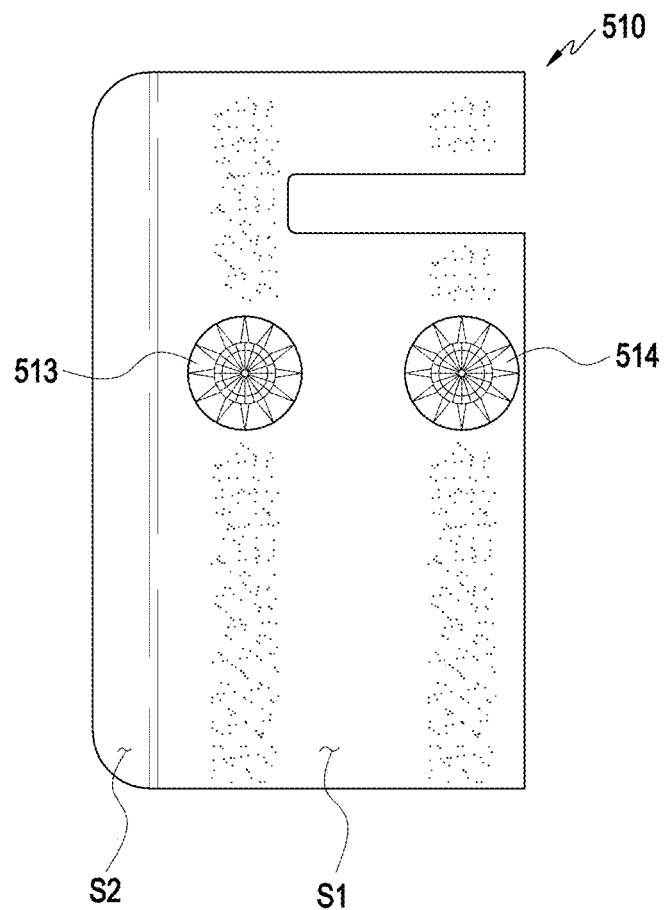
FIG. 12 is a view illustrating an example pattern provided in at least a partial region of a glass plate according to another embodiment of the disclosure.
Figure 13:
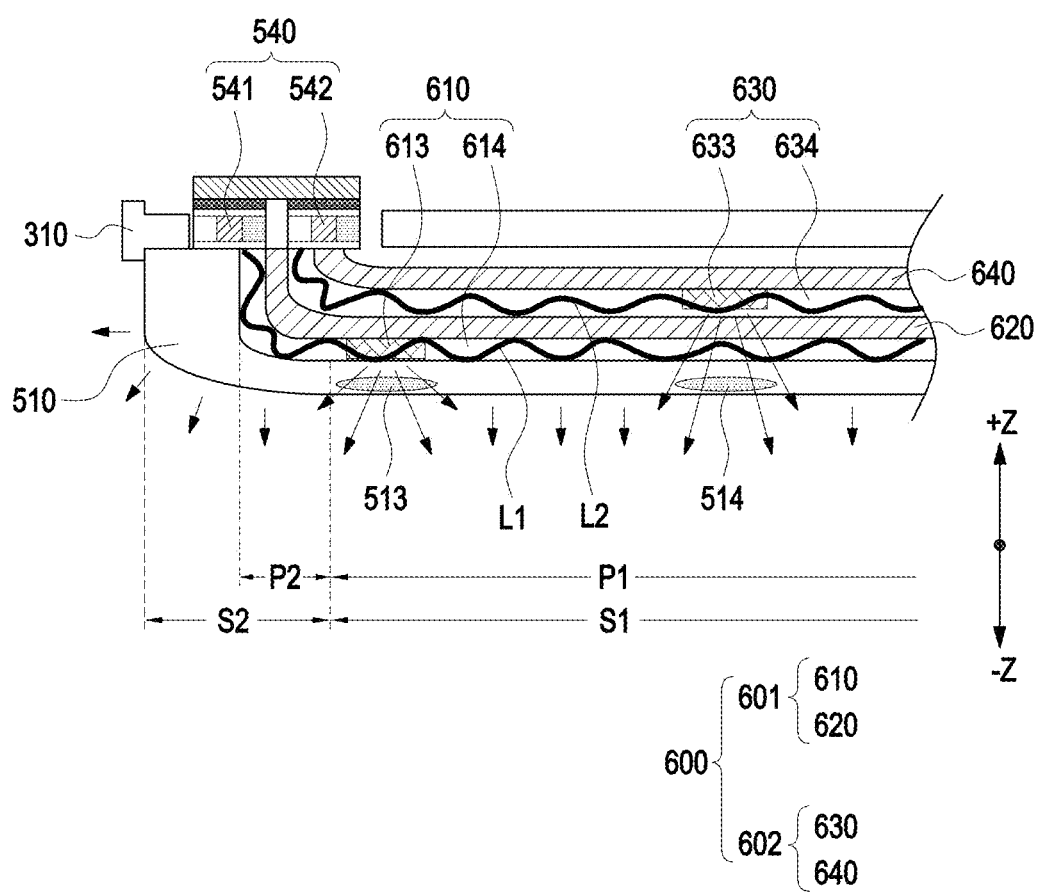
FIG. 13 is a cross-sectional view illustrating an example laminated structure of a rear plate of an electronic device and a path of light provided from a light source unit, according to certain embodiments of the disclosure.

FIG. 12 is a view illustrating a pattern provided in at least a partial region of a glass plate according to another embodiment of the disclosure. FIG. 13 is a cross-sectional view illustrating a laminated structure of a rear plate of an electronic device and a path of light provided from a light source unit, according to certain embodiments of the disclosure.

According to certain embodiments, an electronic device (e.g., the electronic device 101 in FIGS. 1 to 4) may include a housing 310, a display 330, a printed circuit board 340, a glass plate 510, and a printed film layer 600, and a light source unit 540. According to an embodiment, the configurations of the housing 310, the display 330, the printed circuit board 340, the glass plate 510, the printed film layer 600, and the light source unit 540 of FIGS. 12 and 13 may be the same in whole or in part as those of the configurations of the housing 310, the display 330, the printed circuit board 340, the glass plate 510, the printed film layer 600, and the light source unit 540 of FIGS. 5 to 7D.

In FIG. 12, "Z" may indicate the thickness direction (e.g., the widthwise direction) of the electronic device 101. In addition, in an embodiment of the disclosure, "+Z" may indicate the forward direction in which the front plate (e.g., the front plate 320 in FIG. 5) inside the electronic device is oriented, and "−Z" may indicate the rearward direction in which the rear plate (e.g., the rear plate 380 in FIG. 5) is oriented.

Hereinafter, a detailed configuration of the glass plate 510 and a light transmission path, which are different from those of FIG. 5, will be described.

According to certain embodiments, the glass plate 510 may include a flat first region S1 and a second region S2 forming a curved surface extending from the first region S1. The first region S1 may be a central region of the glass plate 510, and the second region S2 may be a portion of an end region of the glass plate 510. The second region S2 may include a curved structure which are seamlessly bent in the forward direction (+Z), and may be disposed in a longitudinal edge region of the glass plate 510.

According to certain embodiments, predetermined first patterns 513 and 514 may be provided in the first region S1 of the glass plate 510. The predetermined first patterns 513 and 514 may be implemented through a micro-blasting method. For example, various images or character patterns may be directly etched on the glass plate 510 using a pattern mask (e.g., a metal mask) on which the various images or character patterns are disposed. The various images and letter patterns may be implemented as 2D and 3D images in at least a partial region of the glass plate 510, according to a design desired by an operator through micro-blasting.

According to certain embodiments, the printed film layer 600 may include a first printed film layer 601 and a second printed film layer 602 having the same structure as the first printed film layer 601 and laminated on the first printed film layer 601.

According to an embodiment, the first printed film layer 601 may include a first molded pattern layer 610 and a first support film layer 620, the first molded pattern layer 610 may be disposed on the glass plate 510 and may have a structure in which second patterns 613 are arranged to face the glass plate 510 (e.g., to be oriented in the second direction (−Z)). The first molded pattern layer 610 may include a first light guide layer 614 forming a first light path L1. The second printed film layer 602 may include the second molded pattern layer 630 and the second support film layer 640, the second molded pattern layer 630 may be disposed on the first support film layer 620 and may include a structure in which third pattern 633 are arranged to face the glass plate 510 (e.g., to be oriented in the second direction (−Z)). The second molded pattern layer 630 may include a second light guide layer 634 forming a second light path L2.

According to certain embodiments, the second pattern 613 of the first molded pattern layer 610 may be disposed at a position corresponding to the (1-1)$^{th}$ pattern 513 provided on the glass plate 510, and the third pattern 633 of the second molded pattern layer 630 may be disposed at a position corresponding to the (1-2)$^{th}$ pattern 514 provided on the glass plate 510.

According to certain embodiments, the light source units 540 may include a first light source unit 541 disposed on a side edge of the housing 310 to face the first molded pattern layer 610 and a second light source 542 disposed to face the second molded pattern layer 630. A plurality of first light source units 541 and a plurality of second light source units 542 may each be respectively arranged along the longitudinal direction of the electronic device 101 or the housing 310, and may provide different light paths, respectively. For the first light source unit 541 and the second light source unit 542, micro-LEDs may be used, and the configuration of the light source unit 540 may be applied to the specific arrangement configurations of thereof.

According to certain embodiments, the light emitted from the first light source unit 541 may form a path L1 of the first light passing through the first light guide layer 614 formed on the first molded pattern layer 610. For example, the light moving along the first light path L1 may be irregularly reflected in a state in which the amount of light is increased in the second pattern 613 and may thus be provided to the glass plate 510. When the light is provided to the (1-1)$^{th}$ pattern 513 of the glass plate 510 disposed at a position facing the second pattern 613, the portion at which the (1-1)$^{th}$ pattern 513 is located may provide a differentiated and dynamic light-emitting effect compared with the surroundings thereof, due to the concentration of light.

According to certain embodiments, the light emitted from the second light source unit 542 may travel along the second light path L2 passing through the second light guide layer 634 formed on the second molded pattern layer 630. For example, the light traveling along the second light path L2 may be irregularly reflected in a state in which the amount of light increases in the third pattern 633, and may thus be provided to the glass plate 510. When the light is provided to the (1-2)$^{th}$ pattern 514 of the glass plate 510 disposed at a position facing the third pattern 633, the portion at which the (1-2)$^{th}$ pattern 514 is located may provide a differentiated and dynamic light-emitting effect compared with the surroundings thereof due to the concentration of light.

The structure of the rear plate according to the disclosure may transmit light through different optical paths for respective first patterns (e.g., the 1-1 pattern 513 and the 1-2 pattern 514) provided on the glass plate 510. Accordingly, it is possible to maintain different aesthetics for each of the respective first patterns, and to provide a diversity of beautiful effects including different colors.

An electronic device (e.g., the electronic device 101 in FIGS. 1 to 4) according to certain embodiments of the disclosure may include: a glass plate (e.g., 510 in FIG. 5) including a first region (e.g., S1 in FIG. 5) and a second region (e.g., S2 in FIG. 5) extending from the first region to form a curved surface, such that at least one predetermined first pattern (e.g., 513 and 514 in FIG. 10) is provided in at least a portion of the first region; a light source unit (e.g., 540 in FIG. 5) disposed adjacent to the second region of the glass plate and configured to provide light from the second region along the first region; a molded pattern layer (e.g., 610 in FIG. 5) disposed on the glass plate and including second patterns (e.g., 611*a* in FIG. 5) arranged to face the glass plate; and a support film layer (620 in FIG. 5) disposed on the molded pattern layer and configured to guide a path of light such that the light provided from the light source unit moves along the inside of the molded pattern layer.

According to certain embodiments, the molded pattern layer may include a flat portion corresponding to the first region (e.g., P1 in FIG. 5) and a curved portion extending from the flat portion and forming a curved surface (e.g., P2 in FIG. 5), and the predetermined second patterns provided on the flat portion may guide light scattering to the predetermined first pattern of the glass plate and a peripheral region around the first pattern.

According to certain embodiments, the molded pattern layer may include a molded pattern structure (e.g., 611 in FIG. 5) in which the predetermined second patterns are arranged at a predetermined interval, and a light guide layer (e.g., 612 in FIG. 5) disposed between the predetermined second patterns to be in contact with one surface of the second patterns and configured to provide a path of the light.

According to certain embodiments, a housing (e.g., 310 in FIG. 5) disposed adjacent to the glass plate may also be included, and the light source unit may include a plurality of light sources arranged along a side edge of the housing.

According to certain embodiments, the second region (e.g., S2 in FIG. 6) may include a $(2-1)^{th}$ region (e.g., S2*a* in FIG. 6) and a $(2-2)^{th}$ region (e.g., S2*b* in FIG. 6), the $(2-1)^{th}$ region and the $(2-2)^{th}$ region may be provided respectively at opposite ends located in the width direction of the glass plate, and the light source unit may include a first light source unit (e.g., 541 in FIG. 6) in which a plurality of micro-LEDs are arranged along the $(2-1)^{th}$ region and a second light source unit (e.g., 542 in FIG. 6) in which a plurality of micro-LEDs are arranged along the $(2-2)^{th}$ region.

According to certain embodiments, each of the predetermined second patterns may include at least one of a pyramidal structure, a triangular structure, or a dot structure protruding toward the glass plate.

According to certain embodiments, the at least one predetermined first pattern of the glass plate may include a structure formed through micro blasting.

According to certain embodiments, the light emitted from the light source unit may form a path of light along the light guide layer provided on the molded pattern layer, and some of the light may be irregularly reflected toward the at least one predetermined first pattern of the glass plate after being concentrated by the predetermined second patterns.

According to certain embodiments, the light source may include a plurality of micro-LEDs and a shielding member (e.g., 545 in FIG. 5), and each of the plurality of micro-LEDs may be mounted inside a side surface of the housing side and disposed to face away from the molded pattern layer. The shielding member may be disposed on one surface of each of the plurality of micro-LEDs to block light directed opposite to the molded pattern layer.

According to certain embodiments, a housing disposed adjacent to the glass plate may be further included, and at least a portion of the housing may be exposed to the outside to define the outer surface of the electronic device.

According to certain embodiments of the disclosure, a housing disposed adjacent to the glass plate may be further included, the glass plate may define an outer surface of the electronic device, and the housing may be disposed in an internal space defined by the glass plate.

According to certain embodiments, an end of the molded pattern layer may include an inclined surface (e.g., 610*a* in FIG. 8) having a predetermined slope for guiding the light emitted from the light source unit.

According to certain embodiments, the predetermined $(1-1)^{th}$ of the glass plate may include a $(1-1)^{th}$ pattern (e.g., 513 in FIG. 11) and a $(1-2)^{th}$ pattern (e.g., 514 in FIG. 11) disposed to be spaced apart from each other, and the predetermined second patterns of the molded pattern layer may include a $(2-1)^{th}$ pattern (e.g., 611*b* in FIG. 11 or 613 in FIG. 13) located to correspond to the $(1-1)^{th}$ pattern and a $(2-2)^{th}$ pattern (e.g., 611*c* in FIG. 11 or 633 in FIG. 13) located to correspond to the $(1-2)^{th}$ pattern.

According to certain embodiments, the light emitted from the light source unit may form a first light path emitted to an outside of the glass plate after being irregularly reflected in a state in which an amount of light is increased in a portion in which the $(2-1)^{th}$ pattern is located to be concentrated in the $(1-1)^{th}$ pattern, and a second light path emitted to the outside of the glass plate after being irregularly reflected in a state in which the amount of light is increased in a portion in which the $(2-2)^{th}$ pattern is located to be concentrated in the $(1-2)^{th}$ pattern.

According to certain embodiments, the molded pattern layer may include a first molded pattern layer (e.g., 610 in FIG. 13) disposed on one surface of the glass plate and a second molded pattern layer (e.g., 630 in FIG. 13) disposed on the first molded pattern layer. The predetermined second pattern may include the $(2-1)^{th}$ pattern (e.g., 613 in FIG. 13) located to correspond to the $(1-1)^{th}$ pattern and disposed in the first molded pattern layer and the $(2-2)^{th}$ pattern (e.g., 633 in FIG. 13) located to correspond to the $(1-2)^{th}$ pattern and disposed in the second molded pattern layer.

According to certain embodiments, the light source unit may include a first light source unit (e.g., 541 in FIG. 13) disposed to face the first molded pattern layer to form a first light path, and a second light source unit (e.g., 542 in FIG. 13) disposed in parallel with the first light source unit and disposed to face the second molded pattern layer so as to form a second light path.

An electronic device (e.g., the electronic device 101 in FIGS. 1 to 4) according to certain embodiments of the disclosure may include: a housing (e.g., 310 in FIG. 5), a printed circuit board (e.g., 340 in FIG. 5) disposed inside the housing, a glass plate (e.g., 510 in FIG. 5) coupled to the housing and having at least one predetermined first pattern (e.g., 513 and 514 in FIG. 10) provided in a partial region thereof, a light source unit (e.g., 540 in FIG. 5) electrically connected to the printed circuit board and configured to provide light toward the glass plate, and a printed film layer (e.g., 600 in FIG. 5) disposed on the glass plate. The printed film layer may include: a molded pattern layer (e.g., 610 of FIG. 5) in which predetermined second patterns (e.g., 611*a* in FIG. 5) are arranged thereon to face the glass plate, and a support film layer (e.g., 620 in FIG. 5) disposed on the molded pattern layer and configured to guide a path of light such that the light provided from the light source unit moves along the inside of the molded pattern layer.

According to certain embodiments, the light source unit may include a plurality of light sources arranged along a side edge of the housing.

According to certain embodiments, the molded pattern layer may include a molded pattern structure in which the predetermined second patterns are arranged at a predetermined interval, and a light guide layer disposed between the predetermined second patterns to be in contact with one surface of the second patterns and configured to provide a path of the light.

An electronic device (e.g., the electronic device 101 in FIGS. 1 to 4) according to certain embodiments of the disclosure may include: a glass plate (e.g., 510 in FIG. 8) including a first region (e.g., S1 in FIG. 8) and a second region (e.g., S2 in FIG. 8) extending from the first region and forming a curved surface, such that at least one predetermined first pattern (e.g., 513 and 514 in FIG. 10) is provided in at least a portion of the first region; a light source unit (e.g., 540 in FIG. 8) disposed adjacent to the second region of the glass plate and configured to provide light from the second region along the first region; a molded pattern layer (e.g., 610 in FIG. 8) disposed on the glass plate and including second patterns (e.g., 611a in FIG. 8) arranged to face the glass plate; and a support film layer (e.g., 620 in FIG. 8) disposed on the molded pattern layer, such that the support film layer is configured to provide a path through which the light provided from the light source unit moves.

It may be apparent to a person ordinarily skilled in the technical field to which the disclosure belongs that an electronic device including a glass plate according to certain embodiments of the disclosure is not limited by the above-described embodiments and drawings, and can be variously substituted, modified, and changed within the technical scope of the disclosure.

What is claimed is:

1. An electronic device, comprising:
a glass plate including a first region and a second region extending from the first region to form a curved surface, wherein at least one predetermined first pattern is formed within at least a portion of the first region;
a light emitter disposed adjacent to the second region of the glass plate and configured to emit light through the second region extending to the first region;
a molded pattern layer disposed on the glass plate, the molded pattern layer including second patterns oriented as to face the glass plate; and
a support film layer disposed on the molded pattern layer and configured to guide a travel path of the emitted light from the light emitter to an interior of the molded pattern layer,
wherein the molded pattern layer includes:
a molded pattern structure in which the second patterns are arranged at a predetermined interval; and
a light guide layer disposed between the second patterns and contacting with a surface of the second patterns, wherein the light guide layer is configured to provide a path for the emitted light.

2. The electronic device of claim 1, wherein the molded pattern layer includes a flat portion corresponding to the first region, and a curved portion extending from the flat portion and forming a curved surface, and
wherein the second patterns provided on the flat portion are configured to guide a scattering of the emitted light according to the predetermined first pattern of the glass plate, and a peripheral region around the first pattern.

3. The electronic device of claim 1, further comprising:
a housing disposed adjacent to the glass plate,
wherein the light emitter further includes a plurality of light emitters arranged along a side edge of the housing,
wherein the second region includes a $(2\text{-}1)^{th}$ region and a $(2\text{-}2)^{th}$ region, which are respectively disposed at width-wise opposing ends of the glass plate, and
wherein the light emitter includes a first light source unit in which a plurality of micro-LEDs are arranged along the $(2\text{-}1)^{th}$ region, and a second light source unit in which a plurality of micro-LEDs are arranged along the $(2\text{-}2)^{th}$ region.

4. The electronic device of claim 1, wherein each of the second patterns includes at least one of a pyramidal structure, a triangular structure, or a dot structure protruding toward the glass plate.

5. The electronic device of claim 1, wherein the at least one predetermined first pattern of the glass plate includes a structure formed through micro blasting.

6. The electronic device of claim 5, wherein the light emitted from the light emitters follows a path along the light guide layer provided on the molded pattern layer, and
wherein some of the emitted light is concentrated by the second patterns and then irregularly reflected toward the at least one predetermined first pattern of the glass plate.

7. The electronic device of claim 2, wherein the light emitter includes a plurality of micro-LEDs and a shielding member,
wherein each of the plurality of micro-LEDs is mounted inside a side surface of a housing of the electronic device, and is disposed to face away from the molded pattern layer, and
wherein the shielding member is disposed on a surface of each of the plurality of micro-LEDs to block any light emitted towards a direction opposite to the molded pattern layer.

8. The electronic device of claim 2, further comprising:
a housing disposed adjacent to the glass plate,
wherein the housing is exposed to an exterior environment of the electronic device, so that at least a portion of the housing forms an outer surface of the electronic device.

9. The electronic device of claim 1, further comprising:
a housing disposed adjacent to the glass plate,
wherein the glass plate forms an outer surface of the electronic device, and the housing is disposed in an inner space defined at least in part by the glass plate, and
wherein an terminal edge of the molded pattern layer includes an inclined surface having a predetermined slope, for guiding the emitted light.

10. The electronic device of claim 1, wherein the predetermined first pattern of the glass plate includes a $(1\text{-}1)^{th}$ pattern and a $(1\text{-}2)^{th}$ pattern spaced apart from each other, and
wherein the second patterns of the molded pattern layer include a $(2\text{-}1)^{th}$ pattern located to correspond to the $(1\text{-}1)^{th}$ pattern, and a $(2\text{-}2)^{th}$ pattern located to correspond to the $(1\text{-}2)^{th}$ pattern.

11. The electronic device of claim 10, wherein the light emitted from the light emitter forms a first light path emitted to an exterior of the glass plate after being irregularly reflected in a state in which an amount of light is increased in a portion in which the $(2\text{-}1)^{th}$ pattern is located to be concentrated in the $(1\text{-}1)^{th}$ pattern, and a second light path emitted to the exterior of the glass plate, after being irregularly reflected in a state in which the amount of light is increased in a portion in which the $(2\text{-}2)^{th}$ pattern is located to be concentrated in the $(1\text{-}2)^{th}$ pattern.

12. The electronic device of claim 10, wherein the molded pattern layer includes a first molded pattern layer disposed on one surface of the glass plate, and a second molded pattern layer disposed on the first molded pattern layer, and wherein the second patterns include the $(2-1)^{th}$ pattern located as to correspond to the $(1-1)^{th}$ pattern and disposed inside the second molded pattern layer, and the $(2-2)^{th}$ pattern located as to correspond to the $(1-2)^{th}$ pattern, and disposed inside the second molded pattern layer.

13. The electronic device of claim 12, wherein the light emitter includes:
   a first light source unit oriented to face the first molded pattern layer so as to form a first light path, and
   a second light source unit disposed in parallel with the first light source unit and oriented to face the second molded pattern layer so as to form a second light path.

14. An electronic device, comprising:
   a housing;
   a printed circuit board disposed within the housing;
   a glass plate coupled to the housing and including at least one predetermined first pattern formed in a partial region thereof;
   a light emitter is electrically connected to the printed circuit board, and configured to emit light toward the glass plate; and
   a printed film layer disposed on the glass plate, wherein the printed film layer includes:
      a molded pattern layer including second patterns which are oriented to face the glass plate, and
      a support film layer disposed on the molded pattern layer and configured to guide a path of the emitted light from the light emitter to an interior of the molded pattern layer,
   wherein the molded pattern layer includes:
   a molded pattern structure in which the second patterns are arranged at a predetermined interval; and
   a light guide layer disposed between the second patterns and contacting with a surface of the second patterns, wherein the light guide layer is configured to provide a path for the emitted light.

* * * * *